United States Patent
Neuhaus et al.

(10) Patent No.: US 11,067,122 B2
(45) Date of Patent: Jul. 20, 2021

(54) ROLLING BODY CAGE FOR A TELESCOPIC RAIL OR A LINEAR GUIDE

(71) Applicant: Accuride International GmbH, Diez (DE)

(72) Inventors: Christoph Neuhaus, Niederelbert (DE); Thomas Quirein, Diez (DE)

(73) Assignee: ACCURIDE INTERNATIONAL GMBH, Diez (DE)

( * ) Notice: Subject to any disclaimer, the term of this patent is extended or adjusted under 35 U.S.C. 154(b) by 0 days.

(21) Appl. No.: 16/471,404

(22) PCT Filed: Jan. 5, 2018

(86) PCT No.: PCT/EP2018/050254
§ 371 (c)(1),
(2) Date: Jun. 19, 2019

(87) PCT Pub. No.: WO2018/127555
PCT Pub. Date: Jul. 12, 2018

(65) Prior Publication Data
US 2019/0390712 A1    Dec. 26, 2019

(30) Foreign Application Priority Data

Jan. 6, 2017    (DE) .................. 20 2017 100 040

(51) Int. Cl.
*A47B 88/40*    (2017.01)
*F16C 29/04*    (2006.01)
(Continued)

(52) U.S. Cl.
CPC ........ *F16C 29/048* (2013.01); *F16C 33/3831* (2013.01); *A47B 2210/0035* (2013.01);
(Continued)

(58) Field of Classification Search
CPC ..... A47B 88/40; A47B 88/477; A47B 88/487; F16C 29/048; F16C 33/3831
(Continued)

(56) References Cited

U.S. PATENT DOCUMENTS

| 3,488,097 | A |   | 1/1970 | Fall |   |
|---|---|---|---|---|---|
| 4,370,007 | A | * | 1/1983 | Fler ...................... | A47B 88/493 312/333 |

(Continued)

FOREIGN PATENT DOCUMENTS

| CN |    2616121 Y | 5/2004 |
|---|---|---|
| CN | 102917618 B  | 1/2016 |

(Continued)

OTHER PUBLICATIONS

Notice of the First Office Action—China National Intellectual Property Administration—dated Mar. 27, 2020.

*Primary Examiner* — James O Hansen
(74) *Attorney, Agent, or Firm* — Snell & Wilmer L.L.P.

(57) ABSTRACT

The present invention concerns a rolling body cage for a linear guide or telescopic rail having rail elements which are displaceable relative to each other, wherein the rolling body cage has at least one bottom portion extending in a longitudinal direction of the rolling body cage, side wall portions which are arranged parallel and which extend on mutually opposite sides of the bottom portion substantially perpendicularly therefrom and in which there are provided rolling body holding recesses for receiving and holding rolling bodies between the raceways of rail elements and at at least a first end of the rolling body cage a connecting bridge which extends between the side wall portions substantially perpendicularly thereto, wherein the bottom portion, the side wall portions and the connecting bridge are produced in one piece from a first plastic. It has been found that both abutment of the inner rail against the rolling body cage and (Continued)

Figure 1:
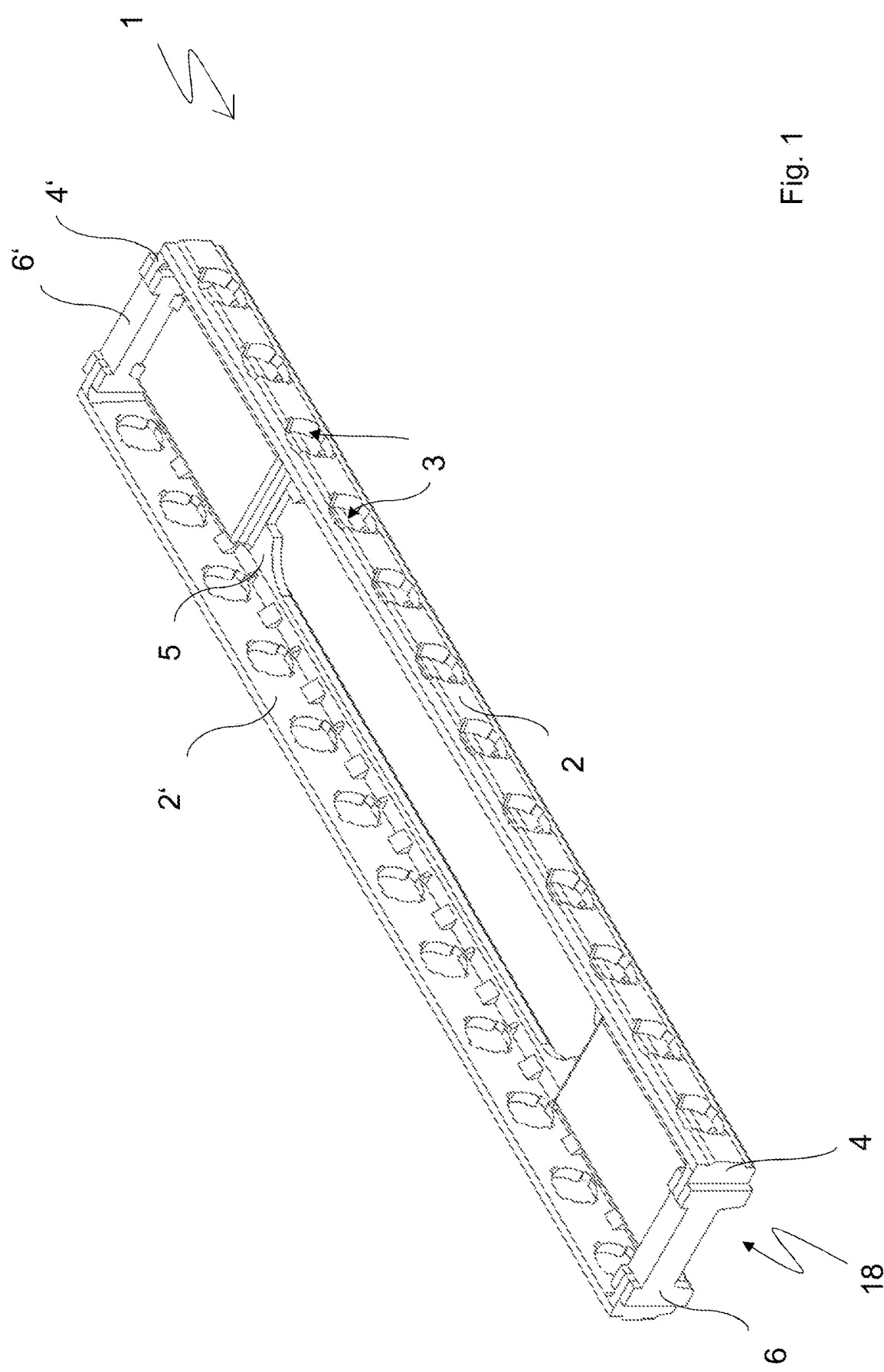

also abutment of the rolling body cage against the end abutment of the outer rail can generate noise which is perceived to be annoying. Therefore an object of the present invention is to further reduce those abutment noises. To attain that object it is proposed according to the invention that a rolling body cage of the kind set forth in the opening part of this specification is provided, in which the connecting bridge at least on two mutually opposite end faces is surrounded by a damping element comprising a second plastic, wherein the second plastic is softer than the first plastic.

21 Claims, 4 Drawing Sheets

(51) Int. Cl.
*F16C 33/38* (2006.01)
*F16C 33/40* (2006.01)
*F24C 15/16* (2006.01)

(52) U.S. Cl.
CPC ... *A47B 2210/0081* (2013.01); *F16C 33/3856* (2013.01); *F16C 33/40* (2013.01); *F24C 15/168* (2013.01)

(58) Field of Classification Search
USPC ....... 312/330.1, 334.1, 334.7, 334.8, 334.11, 312/334.44
See application file for complete search history.

(56) References Cited

U.S. PATENT DOCUMENTS

| | | | |
|---|---|---|---|
| 4,469,384 A * | 9/1984 | Fler | ............ A47B 88/493 312/333 |
| 4,662,761 A | 5/1987 | Hoffman | |
| 4,696,582 A | 9/1987 | Kasten | |
| 5,181,781 A | 1/1993 | Wojcik | |
| 5,184,781 A | 2/1993 | Andela | |
| 2007/0080616 A1 | 4/2007 | Lam et al. | |
| 2013/0076221 A1 | 3/2013 | Hammerle et al. | |
| 2013/0193824 A1 | 8/2013 | Koenig et al. | |
| 2013/0230262 A1 | 9/2013 | Park et al. | |
| 2016/0319868 A1 * | 11/2016 | Kirchhoff | ........... F16C 33/6696 |

FOREIGN PATENT DOCUMENTS

| | | |
|---|---|---|
| DE | 3788214 T2 | 3/1994 |
| DE | 69117449 T2 | 9/1996 |
| DE | 10318781 A1 | 11/2004 |
| DE | 102005028673 A1 | 12/2006 |
| DE | 202008007609 U1 | 8/2008 |
| DE | 102010042180 A1 | 4/2012 |
| EP | 1902256 A1 | 3/2008 |
| JP | H0646933 A | 2/1994 |
| KR | 101259457 B1 | 5/2012 |

* cited by examiner

ROLLING BODY CAGE FOR A TELESCOPIC RAIL OR A LINEAR GUIDE

The present invention concerns a rolling body cage for a linear guide or telescopic rail having rail elements which are displaceable relative to each other, wherein the rolling body cage has at least one bottom portion extending in a longitudinal direction of the rolling body cage, side wall portions which are arranged parallel and which extend on mutually opposite sides of the bottom portion substantially perpendicularly therefrom and in which there are provided rolling body holding recesses for receiving and holding rolling bodies between the raceways of rail elements and at at least a first end of the rolling body cage a connecting bridge which extends between the side wall portions substantially perpendicularly thereto, wherein the bottom portion, the side wall portions and the connecting bridge are produced in one piece from a first plastic.

Rolling body cages for receiving and holding the rolling bodies in rolling body-supported linear guides and telescopic rails are known in the most widely varying configurations from the state of the art. The rolling body cage serves to hold the rolling bodies at a fixed spacing relative to each other in the raceway between two rail elements and to prevent the rolling bodies from falling out of the linear guide or the telescopic rail.

Linear guides and telescopic rails comprise at least two rail elements which are mounted displaceably relative to each other. The term linear guide is usually employed to denote a structure comprising a long rail element and a short rail element which is displaceable on the long rail element and which is also referred to as the slider. In that arrangement the long rail element is substantially the length of the displacement travel plus the length of the slider. Telescopic rails comprise two or more mutually displaceable rail elements.

So that the rail elements of rolling body-supported linear guides and telescopic rails do not diverge and separate from each other their displacement travel is usual limited in both directions of displacement by end abutments. The end abutments are frequently implemented by tabs which are bent up at the ends of the outer rail in the direction of the inner rail which is supported displaceably thereon. The limitation on the displacement travel in the direction of insertion of a telescopic rail is generally effected by the inner rail coming into contact with its end against the tab or tabs at the end of the outer rail. In the case of linear guides in which a slider is mounted displaceably between the two ends of an outer rail that kind of end abutment can also be provided at both ends of the outer rail.

A disadvantage of those conventional linear guides and telescopic rails is that noises can still occur at the end abutment position. In order to damp those noises when reaching the abutment DE 20 2008 007 609 discloses connecting bridges which are arranged at the ends of the rolling body cage and which, when an end of the displacement travel is reached, come into engagement between the end abutment of the outer rail and the inner rail and prevent the inner rail and the outer rail coming into direct mutually butting relationship with each other which is markedly louder.

It has been found however that, particularly when the devices connected to the linear guide or the telescopic rail provide a suitable resonance body, both abutment of the inner rail against the rolling body cage and also abutment of the rolling body cage against the end abutment of the outer rail can still generate noise which is perceived to be annoying.

Therefore an object of the present invention is to further reduce those abutment noises.

That object is attained by a rolling body cage of the kind set forth in the opening part of this specification, in which the connecting bridge is surrounded at least on two mutually opposite end faces by a damping element of a second plastic, wherein the second plastic is softer than the first plastic.

When in the context of the present application reference is made to an outer rail or an inner rail, this denotes conventional rail elements which are known from the state of the art and which are of a substantially C-shaped cross-sectional profile, wherein the raceways for the rolling bodes are provided at the respective end portions or limbs of the C-shaped profile. In the case of the outer rail the raceways are arranged on the mutually facing inside surfaces of the limbs or end portions of the C-shaped profile so that the raceways of the outer rail substantially embrace the rolling body bearing with the rolling body cage. In the case of the inner rail the raceways for the rolling bodies are arranged on the outwardly directed sides of the end portions or limbs of the C-shaped profile. The inner rail runs at least partially within the region embraced by the end portions or limbs of the C-shaped profile of the outer rail.

The term rolling body in accordance with the present application is used to denote a rotational body for example of steel, ceramic or plastic, which as an element of a guide means considerably reduces the friction between the various rails and thus facilitates relative movement of two rails relative to each other. Rolling bodes are for example balls, rollers, barrels, needles or cones.

If in an embodiment of the invention the rolling bodes are balls then the rolling body cage in that case is a ball cage.

The rolling bodies are received at the rolling body cage in the holding recesses provided in the side walls portions.

The rolling body cage comprises at least a bottom portion which substantially determines the width of the ball cage. Extending from that bottom portion are side wall portions which are substantially perpendicular and parallel to each other and having through openings which in the present application are referred to as rolling body holding recesses.

In an embodiment the side wall portions are strip-shaped. The side wall portions can extend in the longitudinal direction of the rolling body cage from one end to the other end. They can however also be in the form of a plurality of shorter portions with interruptions therebetween.

The connecting bridge connects the two side wall portions at a first end of the rolling body cage and also extends substantially perpendicularly relative thereto. The connecting bridge can be of a bar-shaped or strap-shaped configuration as a leg between the side wall portions of the rolling body cage. In addition in an embodiment the connecting bridge is substantially perpendicular to the bottom portion.

The bottom portion, the side wall portions and the connecting bridge are produced in one piece from a first plastic. It will be appreciated that this is preferably effected by injection moulding. In an embodiment of the invention that first plastic is polyoxymethylene (POM) or polyamide (PA, preferably polyamide 6.6).

In that way the bottom portion, the side wall portions and the connecting bridge can be produced easily and inexpensively with the required degree of precision.

According to the invention the connecting bridge is surrounded at least on two mutually opposite end faces by a damping element comprising a second plastic, the second plastic being softer than the first plastic. In the installed condition of the rolling body cage that damping element on the one hand damps the impacting contact of the rolling body cage against the outer rail of a linear guide or telescopic rail and on the other hand the impacting contact of the rolling body cage against an inner rail. To achieve the necessary damping and thus reduction in noise in the abutment situation the second plastic of the damping element is softer than the first plastic of the connecting bridge.

In an embodiment of the invention the second plastic has a Shore hardness of 90 Shore-A or less, preferably 80 Shore-A or less, preferably 70 Shore-A or less and particularly preferably 60 Shore-A or less.

A plastic with such a Shore hardness provides the required acoustic damping.

In an embodiment the plastic has a Shore hardness of 40 Shore-A or more. A plastic with a Shore hardness of 40 Shore-A or more has the necessary toughness not to be damaged by the rails which come into contact with the damping element, even over a large number of actuation cycles.

It has proven to be critical that a damping element which serves for damping impacting contact of the rolling body cage both against the outer rail and also against the inner rail also defines the abutment position of the inner rail relative to the outer rail. By virtue of the fact that the second plastic material is soft the damping element also reduces the precision of the abutment position. In order nonetheless to be able to keep the abutment position within the required tolerances the second plastic of the damping element, on each of the end faces of the connecting bridge, is of a respective thickness in a range of 0.8 mm to 1.6 mm, preferably in a range of 1 mm to 1.5 mm. Such a material thickness, in particular with the proffered Shore hardness of the material, provides sufficient damping, while at the same time the abutment position of the inner rail relative to the outer rail is within the required tolerance. That is the case in particular when the Shore hardness of the second plastic is 90 Shore-A or less and the second plastic of the damping element on each of the two end faces of the connecting bridge is of a respective thickness in a range of 0.8 mm to 1.6 mm. A second plastic with a Shore hardness of 70 Shore-A or less and a damping element thickness on each of the two end faces of the connecting bridge in a range of 1 mm to 1.5 mm is however particularly suitable.

In principle the damping element can be either of a two-part configuration with the bottom portion, the side wall portions and the connecting bridge, or however it can be produced in one piece together with them by multi-component injection moulding.

In the two-component injection moulding procedure in an embodiment the second plastic of the damping element and the first plastic of the connecting bridge are connected together in such a way that the two plastics weld together.

Nonetheless in an embodiment, in particular in embodiments in which welding of the two plastics does not occur, it may be desirable if the second plastic surrounds the connecting bridge in such a way as to provide a captive fixing.

In an embodiment of the invention therefore the connecting bridge is in the form of a strip-shaped wall portion and an opening is provided portion-wise between that strip-shaped wall portion and the bottom portion, wherein the second plastic of the damping element fills the region between the strip-shaped wall portion of the connecting bridge and the bottom portion so that the damping element is captively secured to the connecting bridge.

In a further embodiment the connecting bridge itself has at least one opening, the second plastic of the damping element filling the opening so that the damping element is captively secured to the connecting bridge.

In an alternative embodiment in which the elements of the rolling body cage comprising the first plastic and the damping element comprising the second plastic are not produced by two-component injection moulding but are of a two-part configuration, the damping element has for example a latching element and the connecting bridge has an aperture, the latching element engaging into the aperture so that the damping element is captively received on the connecting bridge.

It will be appreciated that in an embodiment of the invention a respective connecting bridge is provided at the first end and also at the second end of the side wall portions, the respective connecting bridge extending between the side wall portions, wherein each of the connecting bridges is surrounded at least on two mutually opposite end faces by a damping element comprising the second plastic. In that way the above-described functionality is provided on both sides, that is to say at both abutments of a linear guide.

At least one of the above-mentioned objects is also attained by a linear guide or telescopic rail comprising an outer rail, an inner rail, a rolling body cage as was described in embodiments thereof hereinbefore and rolling bodes received in the rolling holding recesses, wherein the outer rail and the inner rail are mounted displaceably relative to each other by means of the rolling bodies held by the rolling body cage, wherein provided at at least one end of the outer rail is an end abutment which limits the displacement of the rolling body cage along the outer rail by contact of the damping element against the end abutment, wherein provided at least at an end of the inner rail, that is towards the end abutment, is an abutment which limits the displacement travel of the rolling body cage along the inner rail by contact of the damping element, against the abutment of the inner rail.

In an embodiment the end abutment at the end of the outer rail is formed from a tab which is bent up out of the material of the outer rail or is formed thereon. That end abutment, preferably the tab which is bent up or formed thereon, at the end of the outer rail, comes into engagement with the damping element at the connecting bridge at the end of the rolling body cage, to limit the displacement travel. The ball cage can then not be displaced any further.

The movement of the inner rail in the direction of displacement is limited by an abutment of the inner rail coming into engagement from the inside with the damping element on the connecting bridge at the end of the ball cage.

It will be appreciated that the abutment of the inner rail in an embodiment is formed by an end of the side wall portions of the inner rail.

It is crucial for functioning of the solution according to the invention that, when the abutment condition is reached, the inner rail and the outer rail do not come into contact directly with each other nor with the first plastic material of the rolling body cage, but only with the damping element.

In an embodiment of the invention end abutments are provided at both ends of the outer rail, abutments are provided at both ends of the inner rail, and connecting bridges with damping elements are provided at both ends of the rolling body cage.

Further advantages, features and configurations of the present invention will be clearly apparent from the description hereinafter of an embodiment and the accompanying Figures.

Figure 2:
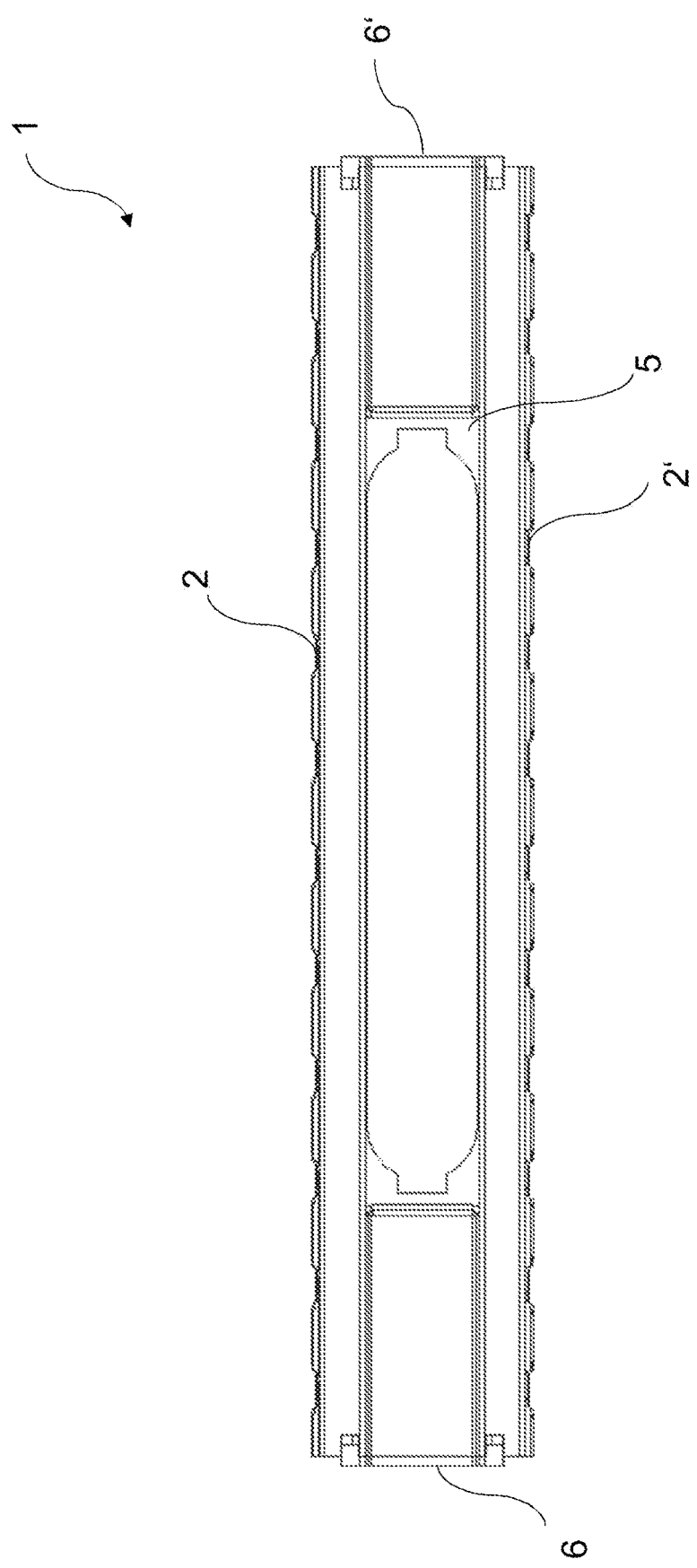
Figure 3:
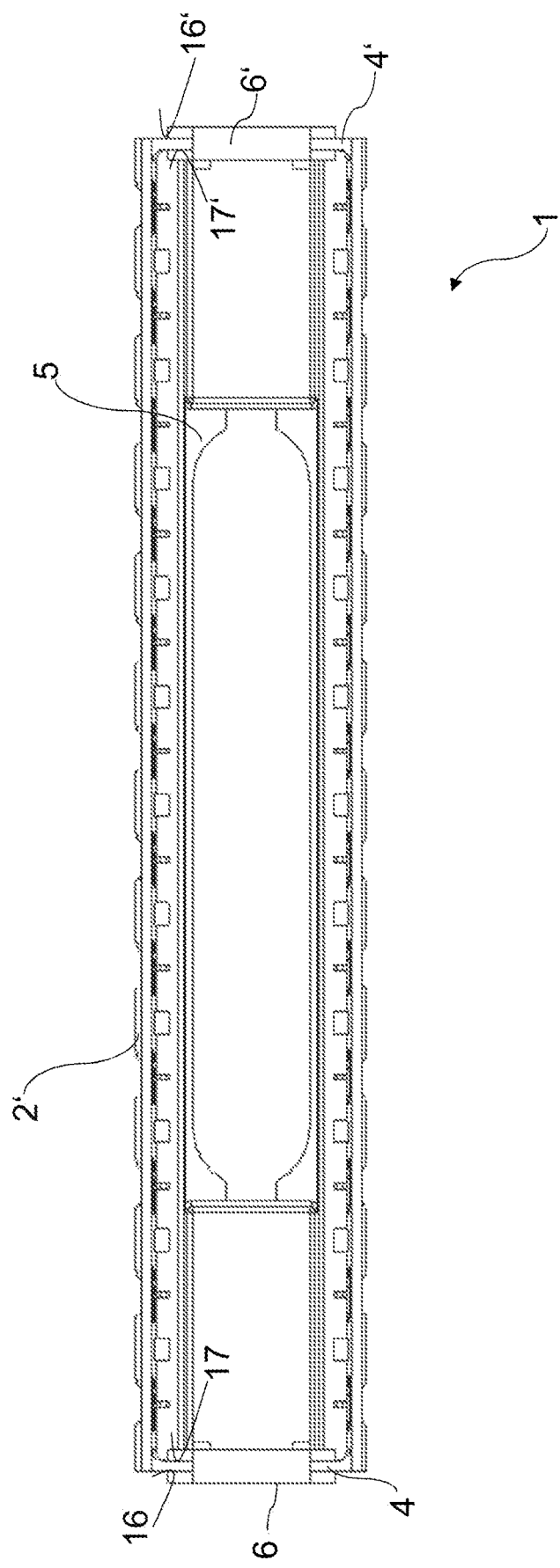
Figure 4:
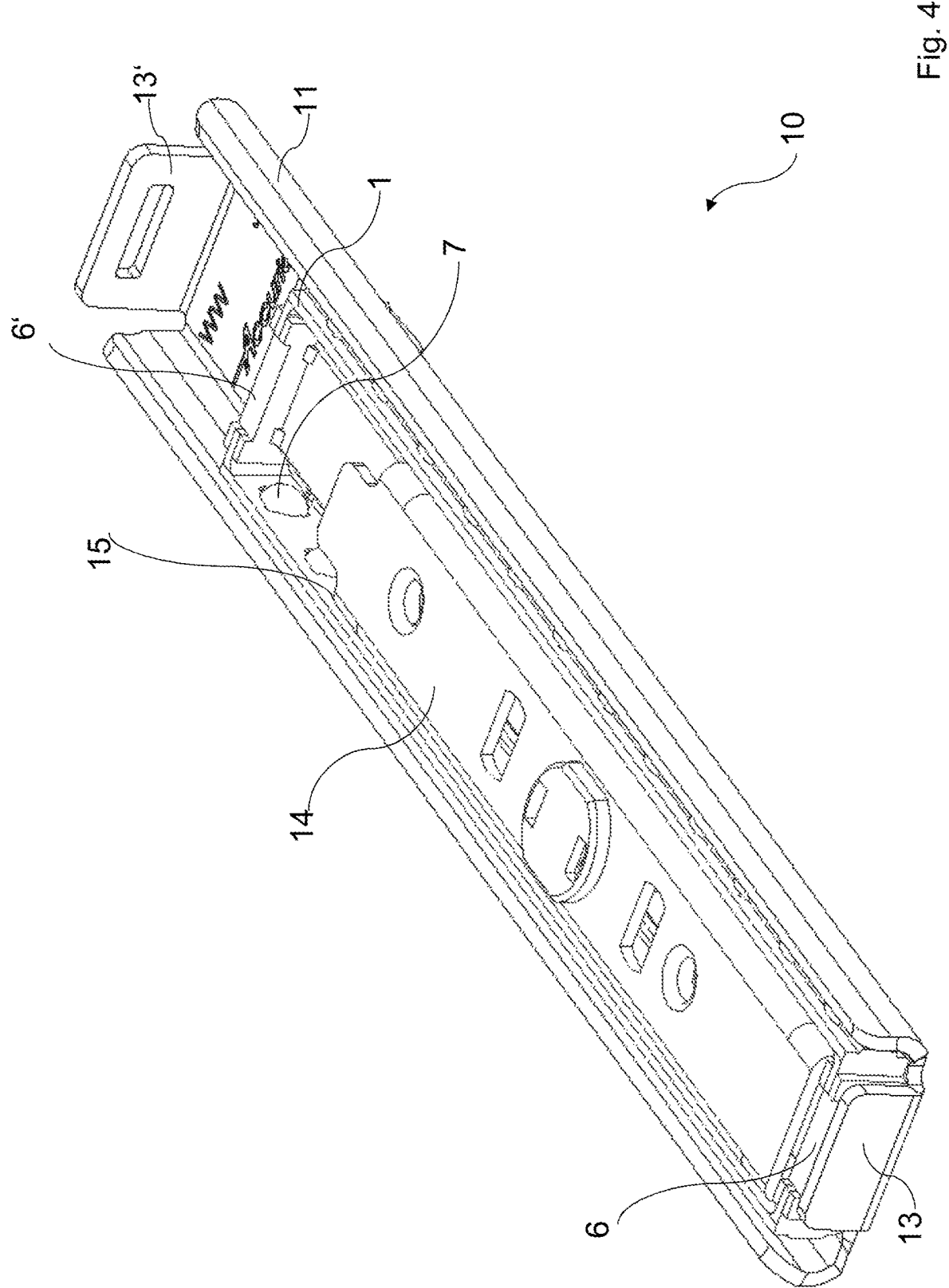

FIG. 1 shows a perspective view of a rolling body cage according to the invention inclinedly from above, FIG. 2 shows a plan view from below of the rolling body cage of FIG. 1, FIG. 3 shows a plan view from above of the rolling body cage of FIGS. 1 and 2, and FIG. 4 is a perspective view inclinedly from above of a linear guide having the rolling body cage according to the invention as shown in FIGS. 1 to 3.

Identical elements are denoted by identical references in the Figures.

FIG. 1 shows a perspective view of a ball cage 1 in the form of a rolling body cage in accordance with the present application. This ball cage 1 comprises two plastic materials, more specifically a first plastic material for the bottom portion 5, the side wall portions 2,2' and a connecting bridge 4,4', and a second plastic for the damping elements 6,6', that is softer in comparison with the first plastic.

The side wall portions 2,2' are strip-shaped and extend in the longitudinal direction both perpendicularly to the bottom portion 5 and also perpendicularly to the connecting bridges 4,4'. Provided in each of the side wall portions 2,2' are a plurality of ball holding recesses 3 serving to receive mounting balls 7. In the illustrated embodiment the ball holding recesses 3 involve through openings in the side wall portions 2,2'. In the view in FIG. 4 which shows a linear guide 10 comprising an outer rail 11, an inner rail 14 and a ball cage 1 as shown in FIGS. 1 to 3, the bearing balls which are received in the openings in the side wall portions 2,2' are denoted by reference 7.

At each of its two ends the ball cage 1 has a respective connecting bridge 4,4' which connects the side wall portions 2,2' together and is made from the same material. If the connecting bridges were not surrounded by the damping elements 6,6', the connecting bridges would come into contact directly with the end abutments 13,13' shown in FIG. 4 on the outer rail 11, but also with the ends of the inner rail 14. Those ends in accordance with the present application form an abutment of the inner rail 14 and are denoted by reference 15 in FIG. 4.

As the connecting bridges 4,4' are each surrounded by a damping element 6,6', wherein the plastic of the damping elements 6,6' is softer than the plastic of the connecting bridge 4,4', the abutment condition is acoustically damped in accordance with the invention. What is decisive for functioning of the damping element 6,6' is that it extends on both end faces 16,16' and 17,17' of the connecting bridges 4,4' so that the damping element 6,6' comes into engagement both with the end abutment 13,13' of the outer rail 11 and also with the abutment 15 of the inner rail 14.

FIG. 3 shows that the plastic of the damping element 6,6' on each of the end faces 16,16', 17,17' is of a thickness of only 1.2 mm. In that way the abutment position of the inner rail 14 relative to the outer rail 11 is defined within the predetermined tolerance range while at the same time adequate damping is provided.

In the illustrated embodiment the plastic of the damping element 6,6' is injection moulded in a two-component injection moulding process around the plastic of the connecting bridges 4,4' so that the second plastic completely encloses the connecting bridge 4,4'. The connecting bridges 4,4' are therefore not injection moulded directly to the bottom portion 5, but provided between the connecting bridges 4,4' is an opening 18, through which the plastic of the damping element (6,6') extends. This therefore provides a high degree of captive security for the damping elements 6,6' which is based not only on welding of the first and second plastics but also on a mechanical undercut configuration action in respect of the connecting bridges 4,4' by virtue of the plastic of the damping elements 6,6'.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

LIST OF REFERENCES

1 ball cage
2,2' side wall portions
3 rolling body holding recess
4,4' connecting bridge
5 bottom portion
6,6' damping elements
7 bearing balls
10 telescopic rail
11 outer rail
13,13' end abutments
14 inner rail
15 abutment of the inner rail
16,16' end faces
17,17' end faces
18 opening between connecting bridge and bottom portion 5

The invention claimed is:

1. A rolling body cage (1) for a linear guide or telescopic rail (10) having rail elements (11, 14) which are displaceable relative to each other, the rolling body cage (1) is characterized in that:

at least one bottom portion (5) extending in a longitudinal direction of the rolling body cage (1);

side wall portions (2, 2') which are arranged parallel and which extend on mutually opposite sides of the bottom portion (5) substantially perpendicularly therefrom and in which there are provided rolling body holding recesses (3) for receiving and holding rolling bodies (7) between raceways of rail elements (11, 14);

at least at a first end of the rolling body cage (1), a connecting bridge (4, 4') which extends between the side wall portions (2, 2') substantially perpendicularly thereto, wherein the bottom portion (5), the side wall portions (2, 2') and the connecting bridge (4, 4') are formed from a first plastic; and a damping element (6, 6') formed from a second plastic surrounding at least two mutually opposite end faces (16, 16', 17, 17') of the connecting bridge (4, 4') wherein the bottom portion (5), the side wall portions (2, 2'), the connecting bridge (4, 4') and the damping element (6, 6') are a one piece multi-component injection moulded unit, wherein the second plastic is softer than the first plastic and has a Shore hardness in a range of 40 Shore-A and 90 Shore-A.

2. A rolling body cage (1) according to claim 1 characterised in that the second plastic is of a Shore hardness of 80 Shore-A or less.

3. A rolling body cage (1) according to claim 1 characterised in that the first plastic includes polyoxymethylene or polyamide and the second plastic includes polyurethane.

4. A rolling body cage (1) according to claim 1 characterised in that the second plastic of the damping element (6, 6') on each of the end faces (16, 16', 17, 17') of the connecting bridge (4, 4') is of a respective thickness in a range of 0.8 mm to 1.6 mm.

5. A rolling body cage (1) according to claim 1 characterised in that the connecting bridge (4, 4') is in the form of a strip-shaped wall portion and provided at least portion-wise between the strip-shaped wall portion and the bottom portion (5) is an opening (18), wherein the second plastic of the damping element (6, 6') fills the opening (18) between the connecting bridge (4, 4') and the bottom portion (5) so that the damping element (6, 6') is captively secured to the connecting bridge (4, 4').

6. A rolling body cage (1) according to claim 1 characterised in that the connecting bridge (4, 4') has at least one opening (18), wherein the second plastic of the damping element (6, 6') fills the opening (18) so that the damping element (6, 6') is captively secured to the connecting bridge (4, 4').

7. A rolling body cage (1) according to claim 1 characterised in that provided at a first end and at a second end of the side wall portions (2, 2') is a respective connecting bridge (4, 4') extending between the side wall portions (2, 2'), wherein each of the connecting bridges (4, 4') at least on two mutually opposite end faces (16, 16', 17, 17') is surrounded by a damping element (6, 6') comprising the second plastic.

8. A rolling body cage (1) according to claim 1 characterised in that the second plastic is of a Shore hardness of 70 Shore-A or less.

9. A rolling body cage (1) according to claim 1 characterised in that the first plastic is polyamide and the second plastic includes polyurethane.

10. A rolling body cage (1) according to claim 1 characterised in that the second plastic of the damping element (6, 6') on each of the end faces (16, 16', 17, 17') of the connecting bridge (4, 4') is of a respective thickness in a range of 1.00 mm to 1.5 mm.

11. A linear guide or telescopic rail (10) comprising:
an outer rail (11);
an inner rail (14);
rolling bodies (7);
a rolling body cage (1) having:
  at least one bottom portion (5) extending in a longitudinal direction of the rolling body cage (1);
  side wall portions (2, 2') which are arranged parallel and which extend on mutually opposite sides of the bottom portion (5) substantially perpendicularly therefrom and in which there are provided rolling body holding recesses (3) that receive and hold the rolling bodies (7) between raceways of rail elements (11, 14);
  at least at a first end of the rolling body cage (1), a connecting bridge (4, 4') which extends between the side wall portions (2, 2') substantially perpendicularly thereto, wherein the bottom portion (5), the side wall portions (2, 2') and the connecting bridge (4, 4') are formed from a first plastic; and
  a damping element (6, 6') formed from a second plastic surrounding at least two mutually opposite end faces (16, 16', 17, 17') of the connecting bridge (4, 4') wherein the bottom portion (5), the side wall portions (2, 2'), the connecting bridge (4, 4') and the damping element (6, 6') are a one piece multi-component injection moulded unit, wherein the second plastic is softer than the first plastic and has a Shore hardness in a range of 40 Shore-A and 90 Shore-A; and
wherein the outer rail (11) and the inner rail (14) are mounted displaceably relative to each other by means of the rolling bodies (7) held by the rolling body cage (1),
wherein provided at least at one end of the outer rail (11) is an end abutment (13, 13') which limits the displacement of the rolling body cage (1) along the outer rail (11) by contact of the damping element (6, 6') against the end abutment (13, 13'), wherein provided at least at an end of the inner rail (14), that is towards the end abutment (13, 13'), is an abutment (15) which limits the displacement travel of the rolling body cage (1) along the inner rail (14) by contact of the damping element (6, 6') against the abutment (15) of the inner rail (14).

12. A linear guide or telescopic rail (10) according to claim 11 characterised in that provided at both ends of the outer rail (11) are end abutments (13, 13'), provided at both ends of the inner rail (14) are abutments (15) and provided at both ends of the rolling body cage (1) are connecting bridges (4, 4') with damping elements (6, 6').

13. A linear guide or telescopic rail (10) according to claim 11 characterised in that the second plastic is of a Shore hardness of 80 Shore-A or less.

14. A linear guide or telescopic rail (10) according to claim 11 characterised in that the first plastic includes polyoxymethylene or polyamide and the second plastic includes polyurethane.

15. A linear guide or telescopic rail (10) according to claim 11 characterised in that the second plastic of the damping element (6, 6') on each of the end faces (16, 16', 17, 17') of the connecting bridge (4, 4') is of a respective thickness in a range of 0.8 mm to 1.6 mm.

16. A linear guide or telescopic rail (10) according to claim 11 characterised in that the connecting bridge (4, 4') is in the form of a strip-shaped wall portion and provided at least portion-wise between the strip-shaped wall portion and the bottom portion (5) is an opening (18), wherein the second plastic of the damping element (6, 6') fills the opening (18) between the connecting bridge (4, 4') and the bottom portion (5) so that the damping element (6, 6') is captively secured to the connecting bridge (4, 4').

17. A linear guide or telescopic rail (10) according to claim 11 characterised in that the connecting bridge (4, 4') has at least one opening (18), wherein the second plastic of the damping element (6, 6') fills the opening (18) so that the damping element (6, 6') is captively secured to the connecting bridge (4, 4').

18. A linear guide or telescopic rail (10) according to claim 11 characterised in that provided at a first end and at a second end of the side wall portions (2, 2') is a respective connecting bridge (4, 4') extending between the side wall portions (2, 2'), wherein each of the connecting bridges (4, 4') at least on two mutually opposite end faces (16, 16', 17, 17') is surrounded by a damping element (6, 6') comprising the second plastic.

19. A linear guide or telescopic rail (10) according to claim 11 characterised in that the second plastic is of a Shore hardness of 70 Shore-A or less.

20. A linear guide or telescopic rail (10) according to claim 11 characterised in that the first plastic is polyamide and the second plastic includes polyurethane.

21. A linear guide or telescopic rail (10) according to claim 11 characterised in that the second plastic of the damping element (6, 6') on each of the end faces (16, 16', 17, 17') of the connecting bridge (4, 4') is of a respective thickness in a range of 1.00 mm to 1.5 mm.

* * * * *